Figure 1:
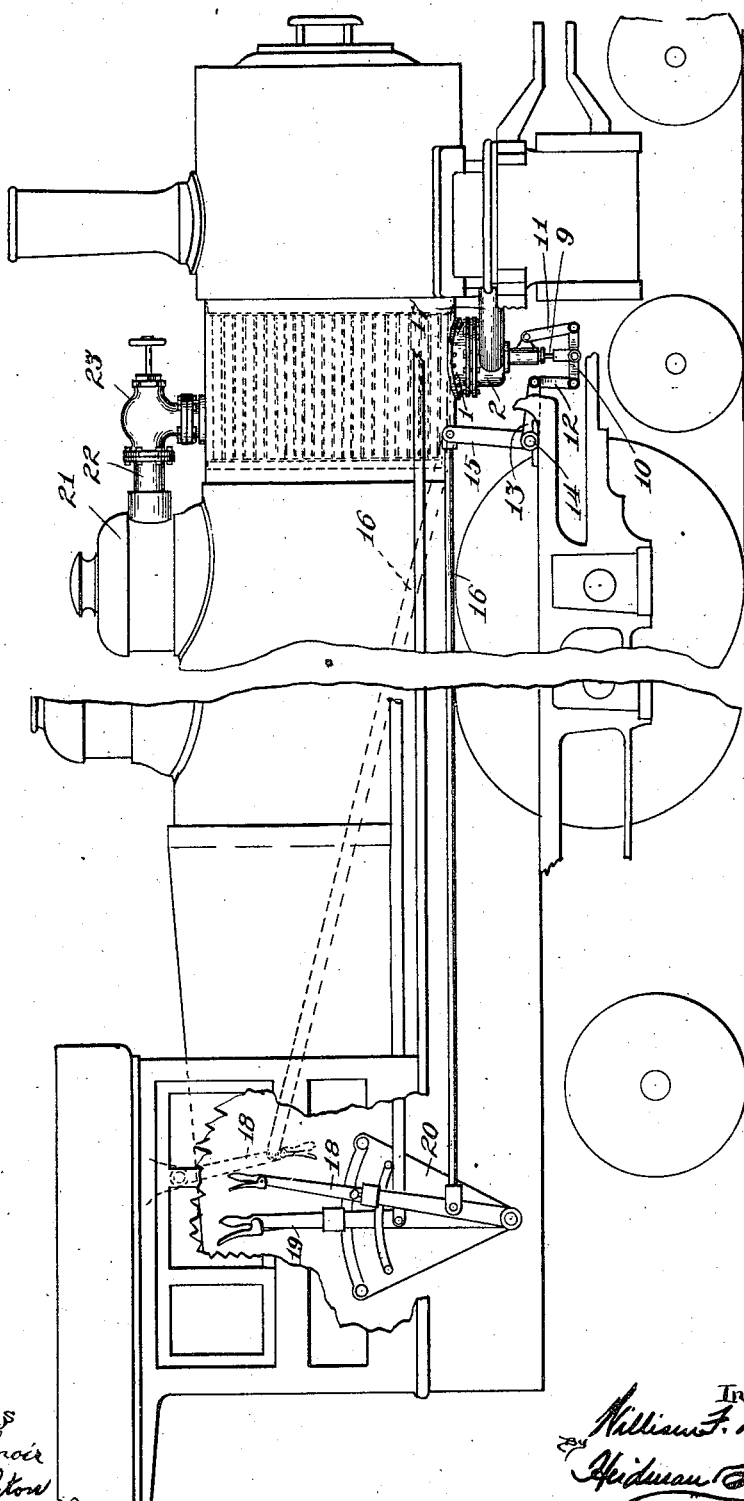

W. F. BUCK.
LOCOMOTIVE.
APPLICATION FILED MAR. 16, 1911.

1,000,489.

Patented Aug. 15, 1911.
5 SHEETS—SHEET 1.

Witnesses
Milton Lenoir
B. E. Wrighton

Inventor
William F. Buck,
by Heidman Street
Attorneys.

W. F. BUCK.
LOCOMOTIVE.
APPLICATION FILED MAR. 16, 1911.
1,000,489.
Patented Aug. 15, 1911.
5 SHEETS—SHEET 2.
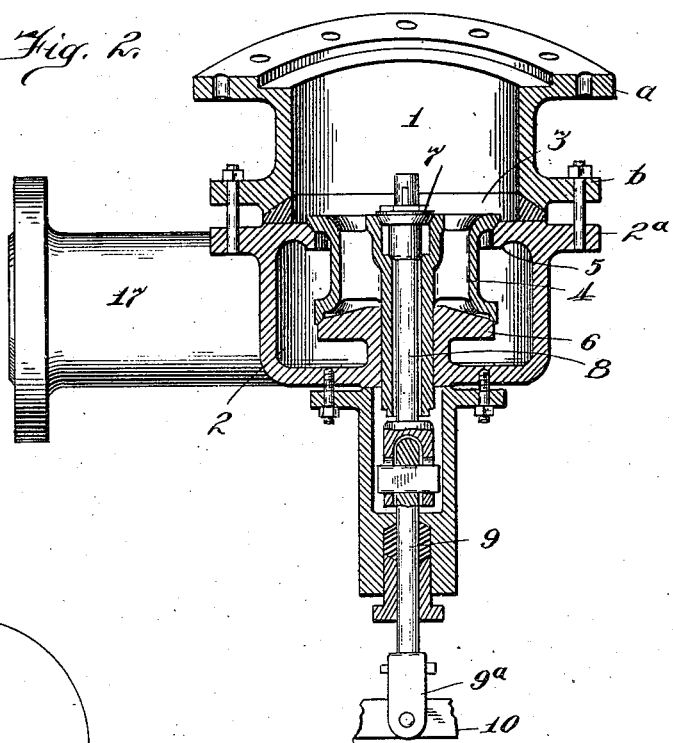
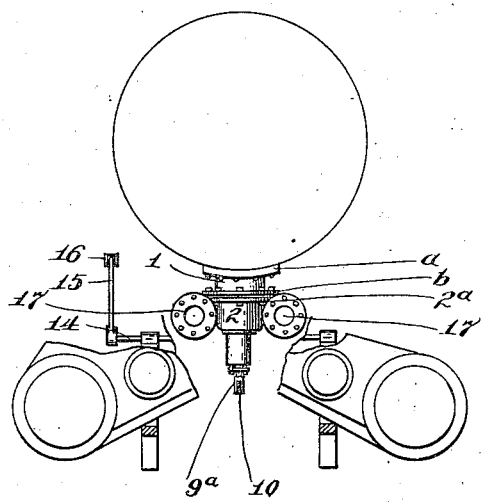

W. F. BUCK.
LOCOMOTIVE.
APPLICATION FILED MAR. 16, 1911.

1,000,489.

Patented Aug. 15, 1911.

6 SHEETS—SHEET 3.

Witnesses
Milton Lenoir
P. E. Wighton

Inventor
William F. Buck,
By Heidman Street
Attorneys.

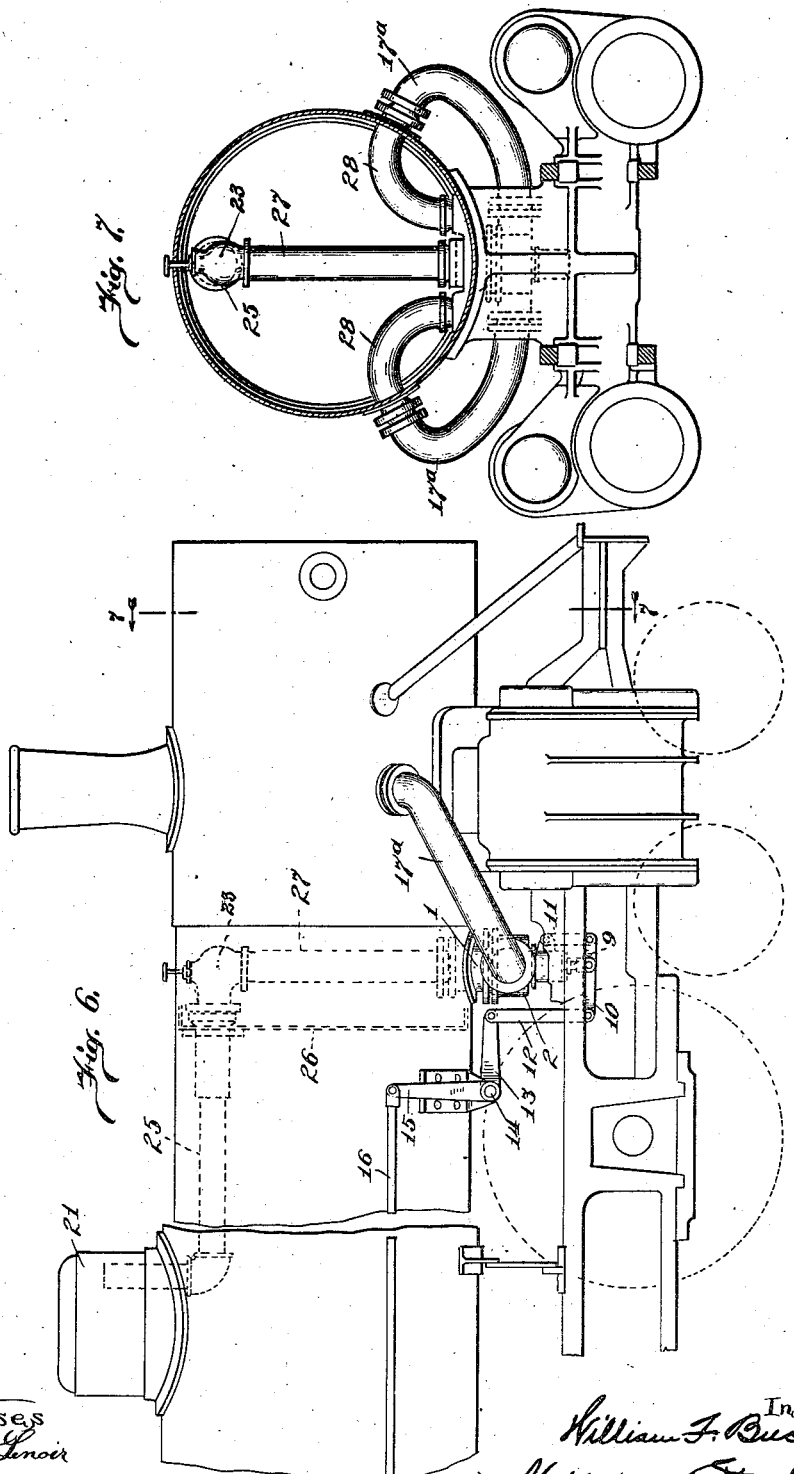

W. F. BUCK.
LOCOMOTIVE.
APPLICATION FILED MAR. 16, 1911.
1,000,489.
Patented Aug. 15, 1911.
5 SHEETS—SHEET 5.
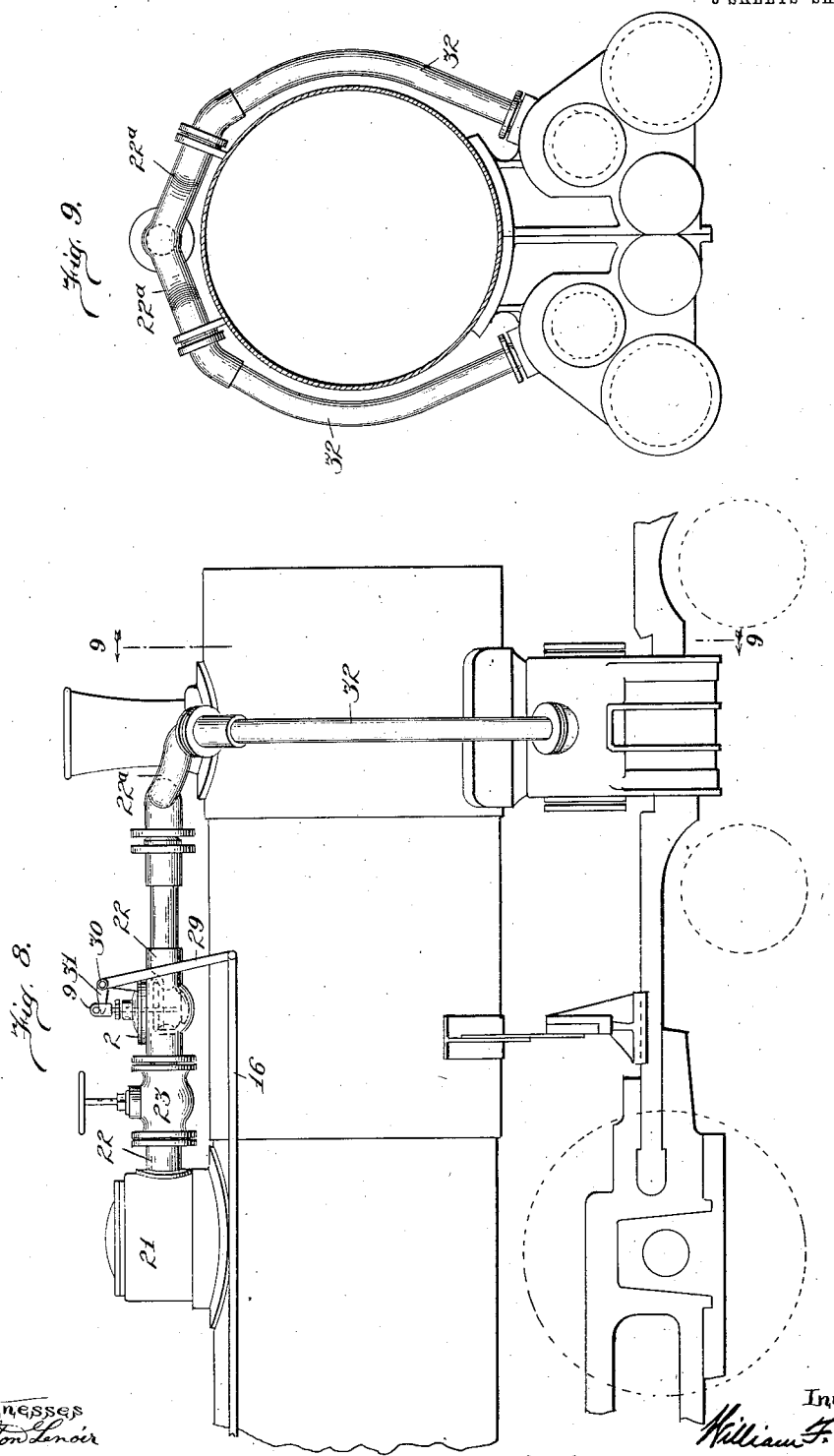

UNITED STATES PATENT OFFICE.

WILLIAM F. BUCK, OF CHICAGO, ILLINOIS.

LOCOMOTIVE.

1,000,489.  Specification of Letters Patent.  Patented Aug. 15, 1911.

Application filed March 16, 1911. Serial No. 614,763.

*To all whom it may concern:*

Be it known that I, WILLIAM F. BUCK, a citizen of the United States, residing in Chicago and State of Illinois, have invented certain new and useful Improvements in Locomotives, of which the following is a description, reference being had to the accompanying drawings, which form a part of my specification.

My invention relates more especially to improvements in locomotives, and has for its object the provision and location of means whereby the flow of steam from the boiler to the cylinders may be controlled, that is the passage of the steam from the source of steam supply, namely from the dome of the boiler to the steam chests of the cylinders, or from the source of steam supply to the superheater and from the superheater to the valve chambers on its way to the cylinders.

The purpose of my invention is the provision of means, for controlling the flow of the steam to the valve chambers of the cylinders, located exteriorly or outside of the boiler shell and in such proximity to the cylinders as is consistent with practical locomotive construction, whereby a much more efficient locomotive is produced.

A further purpose of the invention is to facilitate the work of the locomotive engineer in operating the throttle, which is accomplished by means of a lever located adjacent to the reverse lever of the locomotive. Furthermore, by the use of my invention, the work of repairs will be greatly facilitated; and by reason of the fact that the steam connections will be made exterior of the boiler shell, steam leaks inside of the boiler shell and smoke arch or box will be eliminated and the difficulties heretofore encountered obviated.

It is apparent from my invention as illustrated in the accompanying drawings and described in the following specification, that the various steam connections intermediate of the boiler and the valve chambers of the cylinders, whereby the flow of steam is controlled, are made readily accessible in case of difficulty; and at the same time a much more efficient and quicker acting locomotive is had, as will more fully appear from the following detailed description.

As exemplifications of my invention, I have shown the same applied to locomotives of different types, namely, a locomotive provided with a superheater and locomotives without superheaters; different methods of steam connections, as well as locations of the steam-controlling means, being shown.

Figure 3:
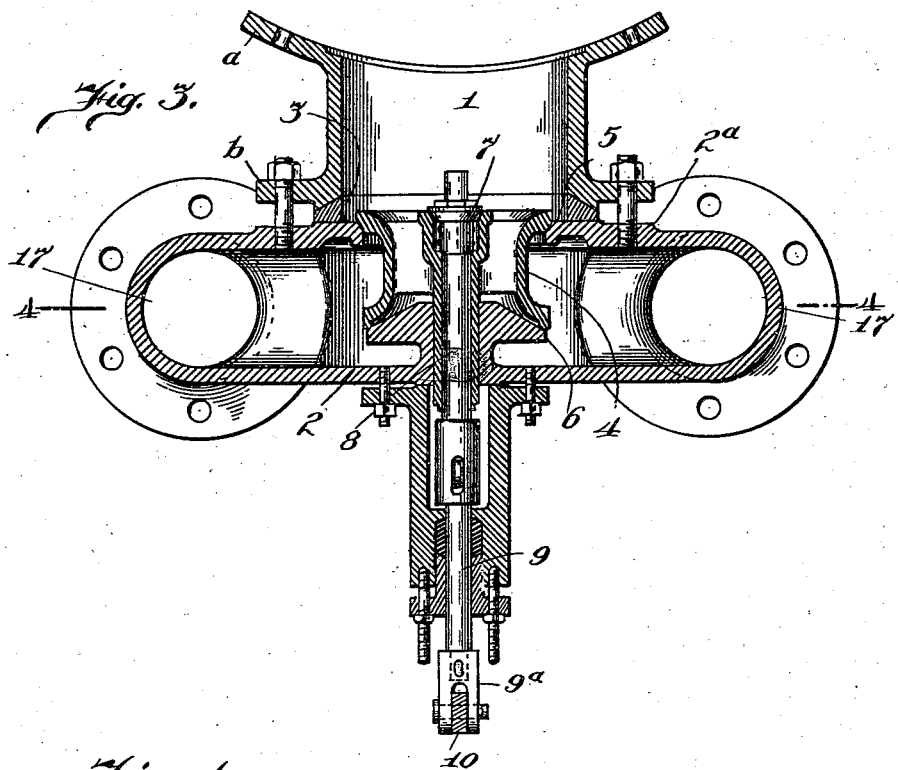
Figure 4:
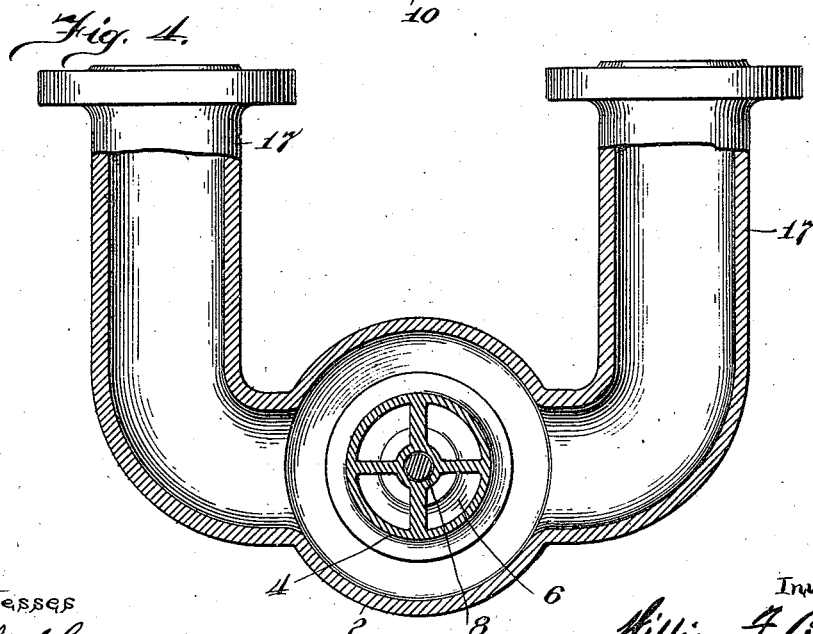

In the drawings:—Figure 1 is a side elevation of a portion of a locomotive illustrating my invention, with a portion of the cab-side broken away to show the mechanical apparatus employed for controlling the throttle. Fig. 2 is a longitudinal sectional view of the external throttle. Fig. 3 is a transverse sectional view of the same, disclosing the steam connections to opposite sides of the throttle. Fig. 4 is a cross sectional view taken on line 4—4 of Fig. 3. Fig. 5 is a front elevation of the throttle and a portion of the locomotive, more clearly illustrating the position of the throttle at the under side of the boiler shell. Fig. 6 is a side elevation of a portion of a locomotive, illustrating the application of my invention to a different type of locomotive, with some of the steam connections arranged within the boiler shell. Fig. 7 is a vertical sectional view taken forward of the smoke stack and cylinders, with the smoke stack removed and the cylinders and steam chests shown in full lines; the flue sheets and boiler tubes however not being shown. Fig. 8 is a side elevation of a portion of a locomotive showing another type of locomotive, illustrating a modified form of my invention, with the steam connections made exterior of the boiler shell. Fig. 9 is a vertical sectional view of same taken forward of the smoke stack and cylinders, with the smoke stack removed and the cylinders and steam chests shown in full lines; the flue sheets and boiler tubes however not being shown.

As before stated, the main object of my invention is to provide a throttle exterior to the boiler shell and preferably so located as near the cylinders as is consistent with practical construction. As an exemplification of one method of accomplishing this result, I disclose the throttle supported by a cast iron or cast steel saddle 1, which is provided with an upper flange a, whereby the saddle is riveted to the lower side of the boiler shell, as clearly indicated in Figs. 1 and 5. This saddle is so formed as to enable a tight connection or joint being formed to permit the passage of the steam from the superheater to the throttle; one method for accomplishing this result is to provide the saddle 1 with the lower annular flange b, which is adapted to be secured to the throttle box 2 by bolts passing through the annular flange b, and the flange 2ª on the upper part of throttle box 2; and a ring 3 is placed intermediate of the throttle box 2 and the saddle 1, see Figs. 2 and 3; the upper edge of the ring 3 is preferably beveled as shown and made to take into the beveled lower orifice of the saddle 1. It is apparent from this construction that when the bolts passing through the flanges b and 2ª of the saddle and throttle box respectively are tightly screwed into place, a tight connection will be formed. It is understood, of course, that the saddle 1 has communication with the interior of the boiler shell, or rather with the superheater located at this point in the boiler shell, so that the steam will flow from the superheater through the saddle 1 and into contact with valve 4 of the throttle. The valve 4 is provided with the valve seats 5 and 6; and in order to equalize the pressure on the valve and to facilitate the operation of the throttle without undue effort on the part of the engineer, the throttle valve 4 is provided with the auxiliary valve 7, passing through the center of valve 4 as clearly shown in Figs. 2 and 3. This auxiliary valve 7 serves to admit the steam by way of several passages through the webs of the main valve 4 from above the main valve 4 to the space beyond or below the main valve, thus balancing the pressure on both sides of the main valve.

The valve mechanism is arranged according to common practice, and forms no part of my invention, so that a further detailed description of the throttle need not therefore be entered into.

The auxiliary valve 7 is controlled by the stem 8, which stem together with main valve 4, is controlled by the stem 9, which is made to extend through the bottom or lower sleeve portion of the throttle-box, as clearly shown in Figs. 1, 2, and 3. The lower portion of stem 9 may be provided with the bifurcated portion or member 9ª as shown, which receives lever 10 and has pivotal connection therewith as shown. Lever 10 is provided with a suitable fulcrum point as for example through the medium of link 11 which may be secured on the throttle housing or box as shown; the opposite end of lever 10 is connected by the link 12 to the arm 13, which in turn is properly secured on the rocker shaft 14. This rocker shaft is provided with lever 15 which has pivotal connection with the reach-rod 16 as clearly shown in Fig. 1; the connection between reach-rod 16 and lever 10 being in the nature of a bell crank lever, which latter is provided with suitable bearings preferably on the truck frame of the engine as shown in Figs. 1 and 5. The fulcrum or rocking point of the bell crank lever is preferably in the nature of a rocker shaft as indicated at 14, which extends from the side of the locomotive to a point adjacent to the throttle as shown in Figs. 1 and 5.

The reach-rod 16 is connected with the throttle lever 18, which, as shown in the drawings, is preferably located adjacent to the reverse lever 19, in the cab of the engine; the well known type of quadrant plate 20 being employed for controlling the positions of the levers. When desired, however, the throttle-lever 18 may be suspended within the cab as shown in dotted lines in Fig. 1, where it is easily accessible and will not be mistaken for any of the other levers. Where the throttle-lever 18 is suspended in the manner indicated in dotted lines, it is of course necessary to have the reach-rod 16 extend upward thereto at an incline as clearly indicated. By placing the levers in the positions indicated, the work of the engineer is greatly facilitated.

In one exemplification of my invention, I have shown the superheater shell contiguous with the shell of the boiler, so that it is apparent that the steam from the superheater will pass through the saddle 1 to the throttle valve 4, and when this valve is opened, the steam will pass between the valve and its seats and be conducted through the pipes 17, 17, to the valve-chambers of the locomotive cylinders.

In locomotives where the shell of the superheater is not contiguous with, or made to form a part of, the boiler shell, it is simply necessary to provide a proper steam connection within the boiler-shell between the superheater and the saddle 1 of the throttle, so as to conduct the steam from the superheater to the throttle.

In Fig. 1, I have shown the steam dome 21 provided with a steam pipe 22 whereby the steam is conducted from the boiler to the superheater. This steam pipe 22 is preferably provided with a T connection in which is located a valve 23, which may be of the ordinary globe type of valve. With this construction, it is evident, that the flow of steam from the boiler to the superheater may be controlled, so that in the event of any leaks or difficulties in the throttle, the flow of steam into the superheater may be shut off until the difficulty has been eliminated.

In constructions as heretofore employed, the steam connections and passages were located within the boiler shell and the throttle was located within the dome of the engine, so that in case of leaks or difficulties, it became necessary to blow-off the engine and allow the same to cool before it was possible to repair the throttle or the internal connections. With my improved construction, however, it is apparent that in case of leaks, the same may be readily repaired without the necessity of blowing off the engine and thus the great loss of time heretofore encountered is eliminated.

By locating the throttle between the superheater and the cylinders in the method described in Fig. 1, it is evident that the steam will be retained in the superheater when the throttle is closed, and be controlled or retarded in its flow through the superheater when the throttle is partially open, resulting in a more efficient locomotive. The retention of the steam in the superheater also improves the condition of the superheater because of the protection afforded by the steam against the effect of the hot gases upon the metal of the superheater, as can be readily understood. Furthermore, the location of the throttle intermediate of the superheater and the cylinders of the engine, or intermediate of the source of steam supply and the cylinders and in proximity to the cylinders, will greatly enhance the starting capacity of the locomotive, because of the prompt delivery of steam to the cylinders from the source of supply, thereby avoiding the delay incident to the constructions heretofore employed wherein it became necessary to wait until sufficient pressure was obtained after filling the long steam connections and the superheater parts intermediate of the boiler and the valve chambers of the cylinders.

In Fig. 6, I have shown my invention applied to a type of locomotive wherein saturated steam is used, and steam connections are employed so as to adapt my invention to a type of locomotive at present in common use. In the construction illustrated in this figure, the steam is led from the steam dome 21 by the pipe 25, shown in dotted lines; this pipe being arranged within the boiler shell, in the manner most commonly followed in American practice, and leads forward to the front flue sheet 26, at which point is provided a dry steam pipe extension 27, whereby the steam is led to the throttle located within the throttle box 2 secured to the under side of the boiler shell in a manner similar to that shown in Fig. 1. The steam may then be conveyed to the cylinders by connections similar to those illustrated in Fig. 1, or the steam may be led from the throttle by the pipes 17ª whereby the invention is adapted for use in connection with a type of locomotive wherein the steam connections with the steam chests are made at the saddle casting inside of the smoke arch or box. The pipes or steam connections 17ª, 17ª, (a pipe extending from both sides of the throttle box, as clearly shown in Fig. 7) unite with the steam connections 28, 28, whereby the steam is led to the cylinders through the saddle casting, thus adapting my invention to a well known style of locomotive now in use. The throttle is operated in a similar manner and by similar mechanism to that shown in Fig. 1 and previously described, with the exception that in Fig. 6, I show the rocker shaft 14 secured to the under side of the boiler shell instead of on the truck frame as shown in Fig. 1. The operation, however, of the throttle and the operating mechanism is in every respect similar to that previously described.

In Figs. 8 and 9, I show another method of applying my invention to a locomotive using saturated steam, wherein all of the steam connections intermediate of the source of steam supply, that is the dome 21 of the boiler and the throttle and between the throttle and the steam chests of the cylinders, are made to the outside of the boiler shell. In this construction, I show the throttle located above the boiler at a suitable point in the steam pipe 22; the auxiliary or shut-off valve 23 being located in the steam pipe 22 intermediate of the steam dome 21 and the throttle-box 2, so that the flow of steam from the boiler to the steam chests of the cylinders may be entirely shut off in case of any leaks or difficulties occurring in the throttle. Instead of employing the lever mechanism shown in Figs. 1 and 6 to raise the throttle valve from its seat, the reach rod 16 is pivotally connected to the rod 29, pivotally secured at 30 and having operative connection with the throttle stem 9 through the link 31, so that a pull on the reach rod 16 will lift the stem 9 together with the throttle valve and permit of the passage of steam from the steam dome 21 through pipe 22 to a point preferably back of the smoke stack, where pipe 21 is bifurcated, and the bifurcations 22ª, 22ª, communicate with the steam connections or external pipes 32, 32, whereby the steam is led down to the steam chests of the cylinders. It is apparent from the construction just described that all of the steam connections intermediate of the source of steam supply and the cylinders are entirely outside of the boiler shell, thereby permitting of repairs being readily made in case of leakage or other difficulties.

I have shown and described exemplifications of my invention which result in a much more efficient locomotive or steam engine, as is clearly evident from the constructions set forth, which I believe to be the simplest and best forms, but it is apparent that the same may be altered in a number of minor details without departing from the spirit of my invention, as the invention is equally applicable to different types of locomotives, and the steam connections intermediate of the source of steam supply and the throttle and intermediate of the throttle and the steam chests of the cylinders may be made in different manners from those shown and described, and I do not wish therefore to be understood as limiting myself to the exact construction shown and described, but

What I claim and wish to secure by Letters Patent is:—

1. A locomotive provided with a superheater, a throttle located intermediate of the superheater and the cylinders, and means located to the outside of the boiler-shell whereby the steam is conveyed from the throttle to the valve chambers of the cylinders.

2. The combination with a locomotive provided with a superheater, of means located outside of the boiler-shell and intermediate of the steam dome and the superheater for conveying steam from the dome to the superheater, and mechanism whereby the passage of steam through said means may be controlled.

3. In a locomotive provided with a superheater, means located on the outside of the boiler-shell whereby the flow of steam from the superheater to the valve chambers of the cylinders is controlled, mechanism whereby said means is operated, and means whereby the flow of the steam from the boiler to the superheater is controlled.

4. In a locomotive provided with a superheater, a throttle located outside of the boiler-shell and adjacent to the cylinders whereby the flow of steam from the superheater to the valve-chambers of the cylinders is controlled, and mechanism located outside of the boiler-shell and intermediate of the engine cab and the throttle whereby the latter is operated.

5. In a locomotive, the combination of a hollow member secured to the outside of the boiler-shell and having communication with the source of steam supply, an external throttle having communication with said member and with the valve-chambers of the oppositely disposed cylinders, means whereby the throttle and member are removably secured together and a tight connection formed between the member and the throttle, and means whereby the communication between said member and the source of steam supply may be controlled.

6. In a locomotive, the combination with a throttle located on the under side of the boiler-shell and in proximity to the cylinders, said throttle having communication with the source of steam supply and with the valve chambers of the oppositely disposed cylinders, a lever located in the cab adjacent to the reverse lever of the locomotive, mechanism intermediate of said lever and the throttle whereby the latter may be moved from its seat, of means located outside of the boiler-shell and intermediate of the source of steam supply and the throttle whereby the flow of steam from the boiler to the throttle may be controlled.

7. In a locomotive, the combination of a superheater, with an externally located throttle intermediate of the superheater and the cylinders, and means for controlling said throttle.

8. In a locomotive provided with cylinders secured to the saddle-castings on which the boiler-shell rests, the combination of an externally located throttle having steam-connections with the source of steam supply and the steam-chests of the cylinders, with means intermediate of the throttle and the source of steam supply whereby the flow of steam to the throttle may be controlled.

9. A locomotive having substantially horizontal cylinders, provided with an externally located throttle, and means intermediate of the throttle and the source of steam-supply whereby the flow of steam to the throttle may be controlled.

10. In a locomotive, the combination of an externally located throttle having steam connections with the source of steam-supply and the steam chests of the cylinders, with means located intermediate of the throttle and the source of steam-supply whereby the flow of steam to the throttle may be controlled.

11. A locomotive provided with a throttle located outside of the boiler-shell and intermediate of the source of steam-supply and the steam chests of the cylinders, whereby the flow of steam to the steam-chests is controlled, and mechanism located outside of the boiler-shell whereby the flow of steam to said throttle may be controlled.

12. A locomotive provided with a throttle located outside of the boiler-shell and having steam connections with the source of steam supply and with the steam-chests of the cylinders, and mechanism located adjacent to the steam-dome for controlling the flow of steam to the throttle.

13. A locomotive provided with steam-connections to the outside of the boiler-shell, at a point intermediate of the source of steam-supply and the cylinders, a throttle located in said connections, means located outside of the boiler-shell whereby the flow of steam to said throttle may be controlled, and means whereby the throttle is operated.

14. In a locomotive, having substantially horizontally arranged cylinders, a throttle located to the outside of the boiler-shell and adjacent to the cylinders, means whereby steam is conveyed from the throttle to the valve chambers of the cylinders and means whereby the flow of steam to the throttle may be shut off.

15. In a locomotive provided with cylinders secured to the saddle-castings on which the boiler-shell rests, an external throttle located adjacent to the cylinders, external steam-connections intermediate of the throttle and the cylinders, and means located intermediate of the throttle and the source of steam-supply whereby the flow of steam to the throttle may be controlled.

WILLIAM F. BUCK.

Witnesses:
W. C. SEYTON,
D. C. THOMAS.